United States Patent
Tsai

(10) Patent No.: US 9,772,013 B2
(45) Date of Patent: Sep. 26, 2017

(54) SAFETY LINEAR ACTUATOR ASSEMBLY

(71) Applicant: MOTECK ELECTRIC CORP., New Taipei (TW)

(72) Inventor: Pen-Yuan Tsai, New Taipei (TW)

(73) Assignee: Moteck Electric Corp., New Taipei (TW)

( * ) Notice: Subject to any disclaimer, the term of this patent is extended or adjusted under 35 U.S.C. 154(b) by 0 days.

(21) Appl. No.: 14/868,089

(22) Filed: Sep. 28, 2015

(65) Prior Publication Data
US 2017/0089435 A1    Mar. 30, 2017

(51) Int. Cl.
  *F16H 25/20*    (2006.01)

(52) U.S. Cl.
  CPC ..... *F16H 25/20* (2013.01); *F16H 2025/2081* (2013.01)

(58) Field of Classification Search
  CPC ............. F16H 25/20; F16H 2025/2031; F16H 2025/204; F16H 2025/2081; F16P 5/00; F16P 7/00
  USPC .......... 74/89.2, 127, 424.71, 424.7; 384/609, 384/613, 617; 192/141
  See application file for complete search history.

(56) References Cited

U.S. PATENT DOCUMENTS

| | | | | |
|---|---|---|---|---|
| 2,616,770 A * | 11/1952 | McPherson | ............. | F03B 11/06 241/46.014 |
| 3,682,283 A * | 8/1972 | Sato | ....................... | B23Q 11/04 192/141 |
| 3,918,277 A * | 11/1975 | Nakk | ....................... | D06F 37/00 68/140 |
| 4,114,747 A * | 9/1978 | Eller | ................... | B23Q 11/0092 188/83 |
| 4,811,813 A * | 3/1989 | Hovanchak | .............. | B62D 3/12 180/444 |
| 5,108,220 A * | 4/1992 | Allen | .................... | E04F 21/247 404/112 |
| 5,910,692 A * | 6/1999 | Saeda | ...................... | F16H 25/20 310/13 |
| 6,158,295 A * | 12/2000 | Nielsen | ................... | F16H 25/20 192/223.4 |
| 6,240,797 B1 * | 6/2001 | Morishima | ......... | F16H 25/2454 188/134 |
| 6,617,747 B1 * | 9/2003 | Petersen | ................... | H02K 1/02 310/216.107 |
| 6,927,513 B2 * | 8/2005 | Schreier | .................. | F16H 25/20 310/12.01 |

(Continued)

*Primary Examiner* — Bobby Rushing, Jr.
(74) *Attorney, Agent, or Firm* — Muncy, Geissler, Olds & Lowe, P.C.

(57) ABSTRACT

A safety linear actuator assembly includes an actuator including a hollow holder frame, a gear set mounted in hollow holder frame, a driver for rotating gear set and a transmission mechanism that includes a lead screw having a stem located at one end and coupled to gear set and a pin mounted in a pin hole at stem, two bearing holders mounted on stem at two sides of the pin and two thrust bearings mounted on the stem and respectively accommodated in the bearing holders, and a retaining ring mounted in a locating groove at the stem. If the stem breaks accidentally due to that the lead screw bears excessive torsion and impact, the retaining ring will be forced against the respective bearing holders and the hollow holder frame, stopping the lead screw from escaping out of the hollow holder frame and assuring a high level of operational safety.

5 Claims, 5 Drawing Sheets

(56) References Cited

U.S. PATENT DOCUMENTS

| | | | | |
|---|---|---|---|---|
| 8,006,579 B2* | 8/2011 | Kuribayashi | ............ | F16H 25/20 |
| | | | | 192/69.62 |
| 8,082,777 B2* | 12/2011 | Szelag | ................. | B60B 7/20 |
| | | | | 73/115.07 |
| 8,210,064 B2* | 7/2012 | Ku | ............... | B66F 3/08 |
| | | | | 74/89.38 |
| 8,376,094 B2* | 2/2013 | Yamasaki | ............... | F16D 65/18 |
| | | | | 188/162 |
| 9,228,646 B2* | 1/2016 | Geppert | ............. | E05B 17/0025 |
| 2005/0160846 A1* | 7/2005 | Chiang | ................ | F16H 25/20 |
| | | | | 74/89.35 |
| 2010/0184543 A1* | 7/2010 | Yamashita | ............ | F16H 63/062 |
| | | | | 474/11 |
| 2011/0232403 A1* | 9/2011 | Yu | ........................ | F16H 25/20 |
| | | | | 74/413 |

* cited by examiner

SAFETY LINEAR ACTUATOR ASSEMBLY

BACKGROUND OF THE INVENTION

1. Field of the Invention

The present invention relates to linear actuator technology and more particularly, to a safety linear actuator assembly, which comprises an actuator comprising a hollow holder frame, a gear set mounted in the hollow holder frame, a transmission mechanism having a lead screw inserted into the hollow holder frame and coupled to the gear set and bearing holders mounted on a stem at one end of the lead screw and disposed inside the hollow holder frame to hold a respective thrust bearing on the stem of the lead screw, and a retaining ring fastened to a locating groove at the stem of the lead screw and positioned in the bearing holder for stopping the lead screw from axial displacement to ensure a high level of operational safety in case the stem of the lead screw breaks accidentally.

2. Description of the Related Art

Many different types of linear actuators with different mechanical and transmission designs are known for use in medical or home beds, massage chairs, fitness machines, rehabilitation equipments, door/window openers, lifting mechanisms and many other electrically controllable displacement devices for elevation or angular position adjustment. During the operation of the motor in a conventional linear actuator, a worm/driving shaft is driven by the motor to rotate a worm gear or gear set and a lead screw, causing movement of a sliding block along the lead screw, and thus, a linked retractable tube or bracket of an external apparatus is moved to achieve elevation or angular position adjustment.

However, during the operation of the worm/driving shaft to rotate the worm gear or gear set and the connected lead screw in moving the linked retractable tube or bracket of the external apparatus, the torsional force thus generated is large. When stopping the actuator, the load can cause the lead screw to rotate in the reversed direction, and the retractable tube (or external apparatus) can fall suddenly, causing an accident. In order to prevent this problem, a brake can be added to the actuator to lock the actuator when it is stopped. Further, during rotation of the lead screw of the actuator, the pin that is fastened to a pin hole at one end of the lead screw to hold a cushion ring between two thrust bearings in respective hearing holders inside a hollow holder frame of the actuator can prohibit the lead screw from axial displacement relative to the hollow holder frame. However, if the lead screw receives a large torsional load and a high impact, a stress concentration can occur at the area of the lead screw around the pin and the lead screw can break and escape out of the hollow holder frame, threatening operational safety. An improvement in this regard is desired.

SUMMARY OF THE INVENTION

The present invention has been accomplished under the circumstances in view. It is one object of the present, invention to provide a safety linear actuator assembly that ensures a high level of operational safety.

To achieve this and other objects of the present invention, a safety linear actuator assembly comprises an actuator that comprises a hollow holder frame, a gear set mounted in the hollow holder frame, a driver adapted for driving the gear set and a transmission mechanism that comprises a lead screw having a stem located at one end thereof and coupled to the gear set, a pin mounted in a pin hole at the stem to secure a cushion ring to the stem, two bearing holders mounted on the stem at two opposite sides relative to the pin and two thrust bearings respectively mounted in the bearing holders around the stem and respectively abutted against two opposite sides of the cushion ring, and a resilient metal retaining ring mounted in a locating groove around the stem. Thus, if the stem breaks accidentally due to that the lead screw receives excessive torsion and impact, the resilient metal retaining ring will be forced against the bearing holder and the hollow holder frame, stopping the lead screw from escaping out of the hollow holder frame and assuring a high level of operational safety. Thus, the retaining ring, effectively prohibits the lead screw of the transmission mechanism from axial displacement, enhancing the overall anti-pull strength of the safety linear actuator assembly.

Even if the part of the stem around the pin hole is broken, the lead screw can still be kept in the actuator, avoiding safety hazards. Further, fastening the retaining ring to the locating groove of the stem inside the bearing holder does not occupy any external space around the actuator, increasing the overall mechanical design and application flexibility. Further, the retaining ring is commercially available product of standard specifications. Further, the use of the retaining ring in the safety linear actuator assembly does not need to change the of the actuator or to create a different mold, saving the cost and enhancing product the competitiveness of the product.

Further, during rotation of the lead screw of the transmission mechanism, the pin mounted in the pin hole at the stem to secure the cushion ring to the stem will be rotated between the two bearing holders, causing the cushion ring to abut against the respective thrust bearings in respective bearing holders and preventing the lead screw from escaping out of the outer cup of the hollow holder frame. At this time, the thrust bearings bear axial thrust loads and high impact loads and ensure stability of the overall structure. Subject to the low friction resistance of the thrust bearings by using the rolling elements thereof, the lead screw can be rotated smoothly.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
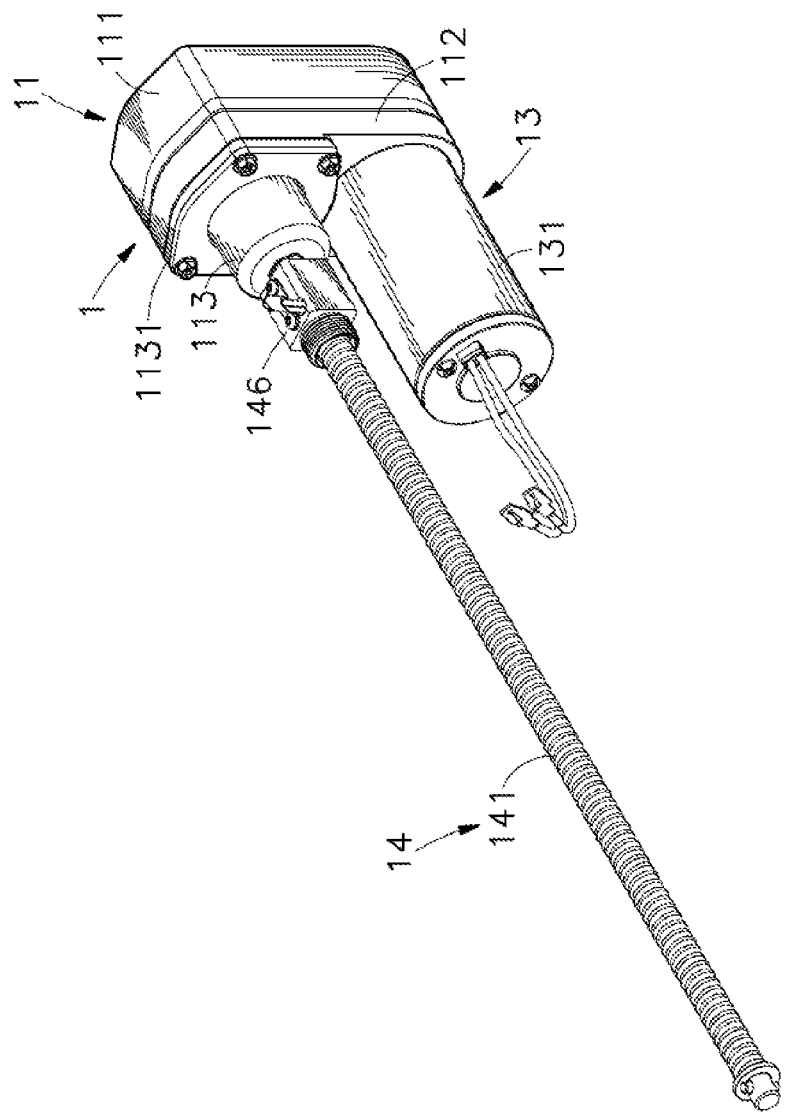
FIG. 1 is an oblique top elevational view of a safety linear actuator assembly in accordance with the present invention.
Figure 2:
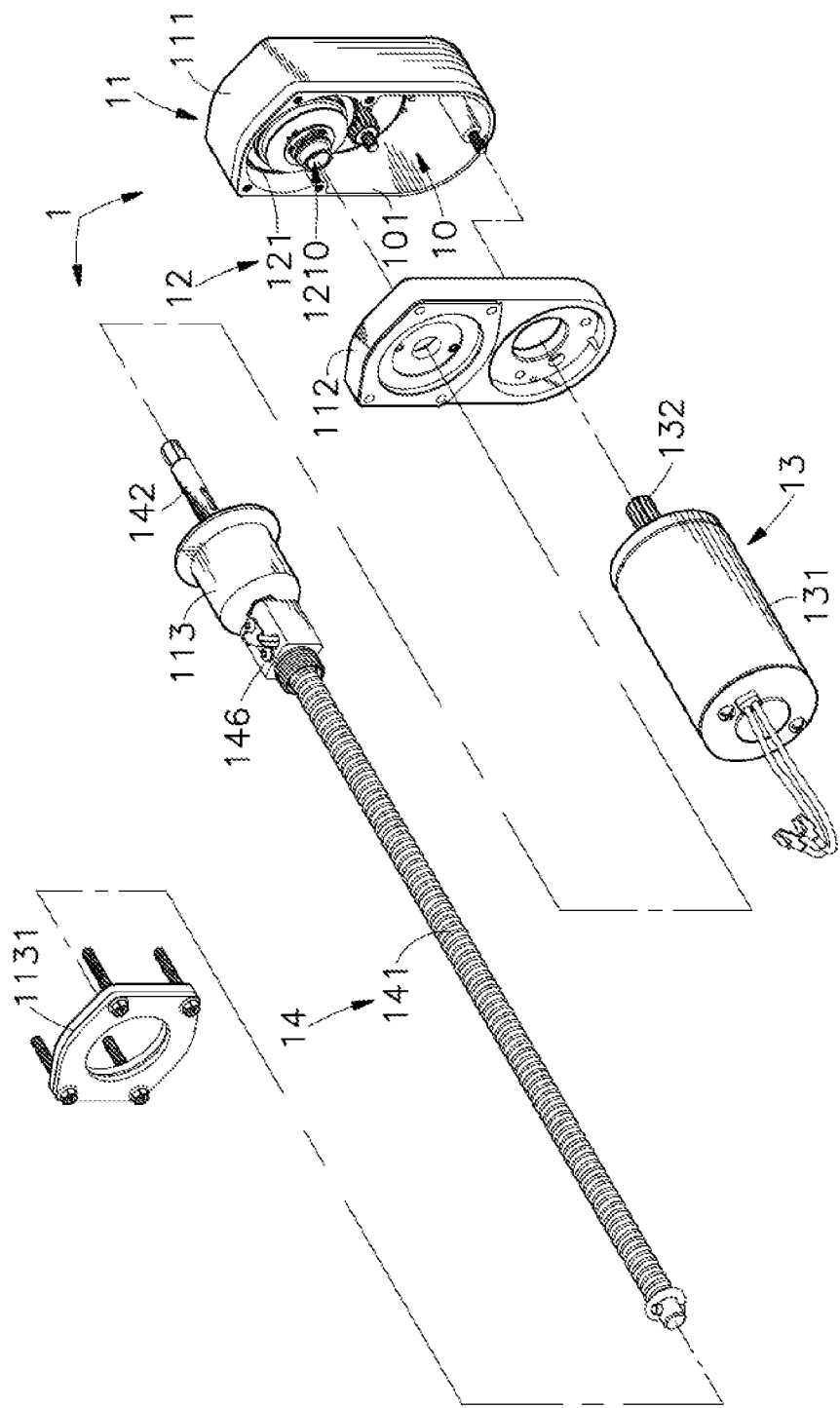
FIG. 2 is an exploded view of the safety linear actuator assembly in accordance with the present invention.
Figure 3:
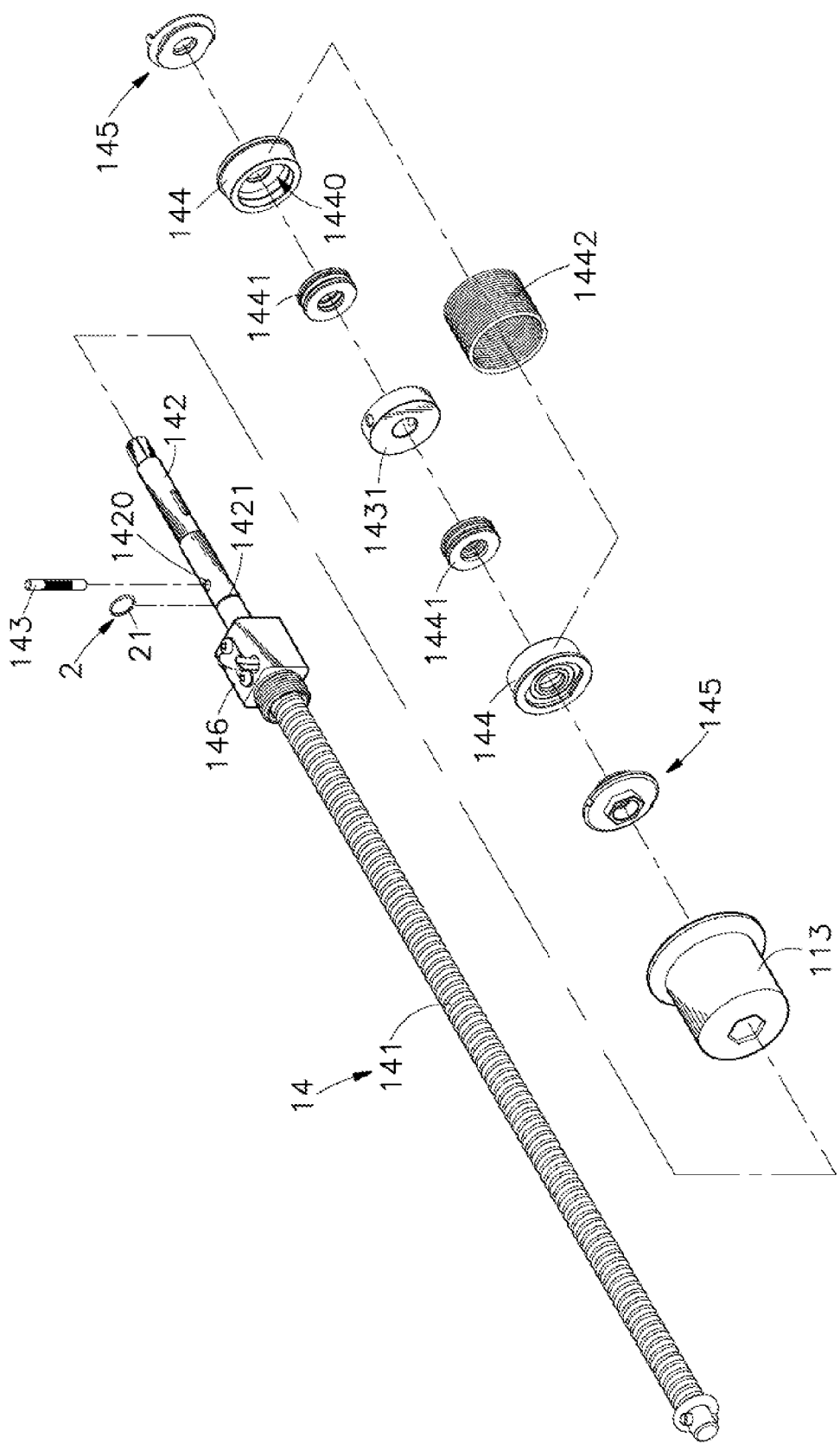
FIG. 3 is an exploded view of a part of the safety linear actuator assembly in accordance with the present invention.
Figure 4:
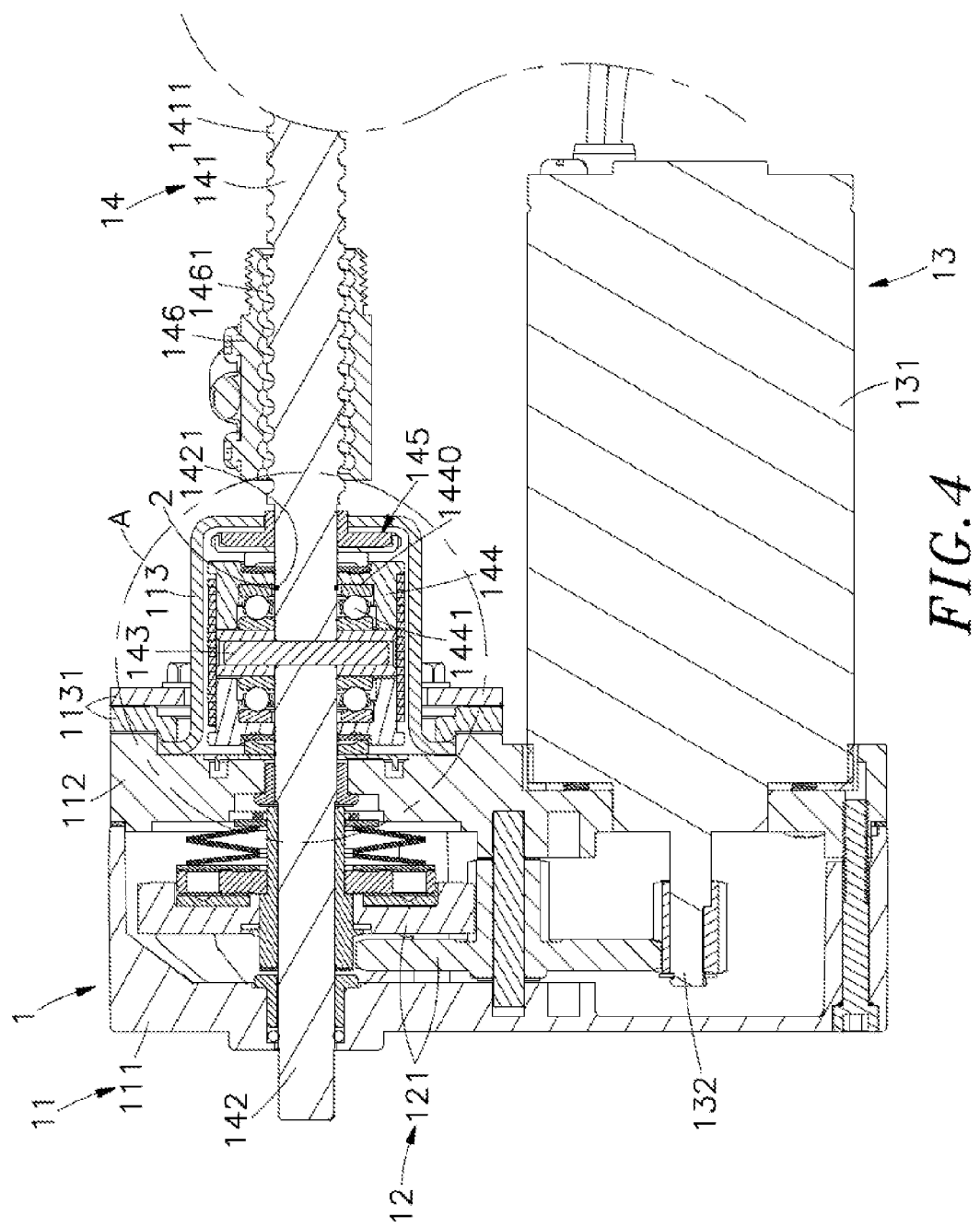
FIG. 4 is a sectional side view of the safety linear actuator assembly in accordance with the present invention.
Figure 5:
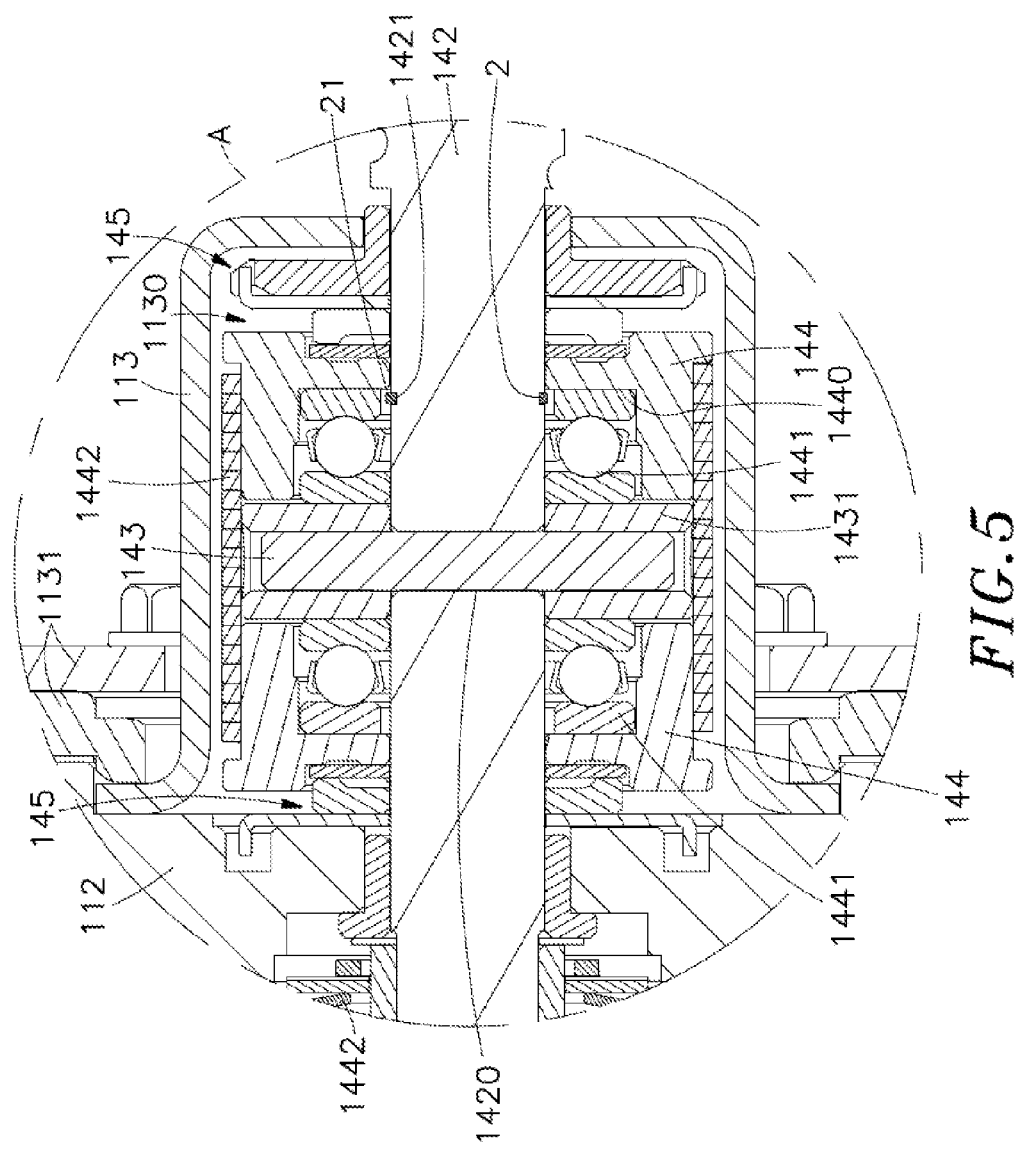
FIG. 5 is an enlarged view of a part of FIG. 4.

Referring to FIGS. 1-5, an oblique top elevational view of a safety linear actuator assembly in accordance with the present invention, an exploded view of the safety linear actuator assembly, an exploded view of a part of the safety linear actuator assembly, a sectional side view of the safety linear actuator assembly and an enlarged sectional side view of a part of the safety linear actuator assembly are shown. As illustrated, the safety linear actuator assembly comprises an actuator 1 and a retaining ring 2.

The actuator 1 comprises a hollow holder frame 11 defining therein an accommodation chamber 10 that has an opening 101 at each of opposing front and rear sides thereof, a gear set 12 mounted in the accommodation chamber 10 and comprising a driven gear (such as: worm gear or spur gear) 121 having a mounting hole 1210 cut through two opposite sides thereof at the center, a driver 13 mounted on the inside for outside) of the hollow holder frame 11 and comprising a motor 131 inserted into the hollow holder frame 11 and engaged with the driven gear 121 of the gear set 12 and a driving shaft (such as: worm or a shaft with a spur gear) 132 and rotatable by the motor 131, and a transmission mechanism 14 coupled to the gear set 12 and drivable by the gear set 12 to rotate a lead screw 141 thereof. The lead screw 141 of the transmission mechanism 14 can be selectively arranged in a perpendicular or parallel manner relative to the motor 131.

Further, the hollow holder frame 11 comprises a base frame 111, a cover plate 112, an outer cup 113, and a fixation plate 1131. The cover plate 112 is affixed to the base frame 111 over the front-sided opening 101 of the base frame 111 with screws. The outer cup 113 is capped on the cover plate 112. The fixation plate 1131 is affixed to the cover plate 112 with screws to fixedly secure the outer cup 113 to the cover plate 112 outside the base frame 111. The outer cup 113 defines therein a receiving chamber 1130. The lead screw 141 of the transmission mechanism 14 comprises an outer thread 1411 spirally extending around the periphery thereof, a stem 142 axially extended from one end thereof and inserted through the outer cup 113 and then fastened to the mounting hole 1210 of the driven gear 121, and a pin hole 1420 transversely cut through the stem 142. The transmission mechanism 14 further comprises a cushion ring 1431 sleeved onto the stem 142 and disposed in the receiving chamber 1130 inside the outer cup 113, and a pin 143 mounted in the pin hole 1420 and inserted through the cushion ling 1431 to secure the cushion ring 1431 to the stem 142.

The transmission mechanism 14 further comprises a plurality of bearing holders 144 mounted on the stem 142 of the lead screw 141 at two opposite sides relative to the pin 143 and the cushion ring 1431, a thrust bearing 1441 mounted in a recessed chamber 1440 in each bearing holder 144 and abutted against a respective one side of the cushion ring 1431, a spring member 1442 mounted between the two bearing holders 144 to move the two bearing holders 144 in direction toward each other so as to normally keep the two thrust bearings 1441 in abutment against the two opposite sides of the cushion ring 1431, two fitting sets 145 mounted on the stem 142 at two opposite sides relative to the two bearing holders 144 and respectively affixed to the cover plate 112 and the outer cup 113. Preferably, each fitting set 145 comprises a washer mounted on the stem 142 and abutted against the associating bearing holder 144, a positioning plate mounted on the stem 142 and affixed to the cover plate 112 or outer cup 113, and a friction wheel mounted on the stem 142 and sandwiched between the washer and the positioning plate. Further, the stem 142 of the lead screw 141 has a locating groove 1421 extended around the periphery thereof and disposed in the recessed chamber 1440 of the bearing holder 144. The transmission mechanism 14 further comprises a sliding block 146 defining therein a screw hole 1461 that is threaded onto the outer thread 1411 of the lead screw 141 outside the hollow holder frame 11 such that rotation of the lead screw 141 causes the sliding block 146 to move linearly along the lead screw 141.

The retaining ring 2 is a C-shaped resilient metal ring attached to the locating 1421 at the stem 142 of the lead screw 141, comprising two flanged end portions 21 at two opposite ends thereof. After installation of the retaining ring in the stem 142 of the lead screw 141, the flanged end portions 21 of the retaining ring 2 are engaged in the locating groove 1421. Further, the outer diameter of the retaining lung 2 is slightly larger than the outer diameter of the stem 142. After installation of the retaining ring 2 in the locating groove 1421 at the stem 142 of the lead screw 141, the retaining ring 2 radially and partially protrudes over the periphery of the stem 142 and engaged into the grooved periphery of the thrust bearing 1441 in the bearing holder 144 with the respective flanged end portions 21 partially engaged into the locating groove 1421 and partially engaged in the recessed chamber 1440 of the bearing holder 144 and to prohibit the stem 142 from axial displacement relative to the bearing holders 144.

The actuator 1 is applicable to an external apparatus (such as medical or home bed, massage chair, fitness machine, rehabilitation equipment, door/window opener, lifting mechanism or any other electrically controllable displacement device). In application, mount the base frame 111 of the hollow holder frame and the sliding block 146 or sliding block 146 of the transmission mechanism 14 in a retractable tube (not shown), and then affix the retractable tube to a link or bracket of the external apparatus. When the motor 131 of the driver 13 is started to rotate the driving shaft 132 and the meshed gear set 12, the lead screw 141 is rotated with the gear set 12, and the sliding block 146 is forced to move along, the lead screw 141 and to further extend out or retract the retractable tube, achieving elevation or angular position adjustment.

Further, during rotation of the lead screw 141 of the transmission mechanism 14, the pin 143 will be rotated with the cushion ring 1431 and the stem 142 between the two hearing holders 144, causing the cushion ring 1431 to abut against the respective thrust bearings 1441 in the respective bearing holders 144 and preventing the lead screw 141 from escaping out of the outer cup 113 of the hollow holder frame 11. At this time, the thrust bearings 1441 bear axial thrust loads and high impact loads and ensure stability of the overall structure. Subject to the low friction resistance of the thrust bearings 1441 by using the rolling elements thereof, the lead screw 141 can be rotated smoothly.

If the stem 142 of the lead screw 141 bears excessive torsion and impact and breaks due to concentration of stress on the area around the pin hole 1420, the lead screw 141 can be driven out of the hollow holder frame 11 by the connected part of the apparatus, causing accidental injuries. However, due to the arrangement of the retaining ring 2, this problem is eliminated. If the stem 142 breaks accidentally and the lead screw 141 is driven by the connected part of the external apparatus to move in direction away from the hollow holder frame 11, the resilient metal retaining ring 2 that is fastened to the locating groove 1421 at the stem 142 will be forced against the bearing holder 144 and the hollow holder frame 1, stopping the lead screw 141 from escaping out of the hollow holder frame 11. Thus, the retaining ring 2 effectively prohibits the lead screw 141 of the transmission mechanism 14 from axial displacement, enhancing the overall anti-pull strength of the safety linear actuator assembly. Even if the part of the stem 142 around the pin hole 1420 is broken, the lead screw 141 can still be kept in the actuator, avoiding safety hazards. Further, fastening the retaining ring 2 to the locating groove 1421 of the stem 142 inside the bearing holder 144 does not occupy any external space around the actuator 1, increasing the overall mechanical design and application flexibility. Further, the retaining ring 2 is commercially available product of standard specifications. Further, the use of the retaining ring 2 in the safety linear actuator assembly does not need to change the specification of the actuator 1 or to create a different mold, saving, the cost and enhancing product the competitiveness of the product.

In conclusion, the invention provides a safety linear actuator, which comprises an actuator 1 that comprises a hollow holder frame 11, a gear set 12 mounted in the hollow holder frame 11, a driver 13 adapted for driving the gear set 12 and a transmission mechanism 14 that comprises a lead screw 141 having a stem 142 located at one end thereof and coupled to the gear set 12, a pin 143 mounted in a pin hole 1420 at the stem 142 to secure a cushion ring 1431 to the stem 142, two bearing holders 144 mounted on the stem 142 at two opposite sides relative to the pin 143 and two thrust bearings 1441 respectively mounted in the bearing holders 144 around the stem 142 and respectively abutted against two opposite sides of the cushion ring 1431, and a resilient metal retaining ring 2 mounted in a locating groove 1421 around the stem 142. Thus, if the stem 142 breaks accidentally due to that the lead screw 141 bears excessive torsion and impact, the resilient metal retaining ring 2 will be forced against the bearing holder 144 and the hollow holder frame 1, stopping the lead screw 141 from escaping out of the hollow holder frame 11 and assuring a high level of operational safety.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A safety linear actuator assembly, comprising:
an actuator comprising a hollow holder frame defining therein an accommodation chamber, a gear set mounted in said accommodation chamber, a driver mounted outside said hollow holder frame and adapted for driving said gear set, and a transmission mechanism disposed outside said hollow holder frame and coupled to said gear set, said transmission mechanism comprising a lead screw, said lead screw comprising a stem axially extended from one end thereof and inserted into said hollow holder frame and coupled to said gear set, a pin hole transversely cut through said stem, a pin fastened to said pin hole and a locating groove extending around the periphery of said stem relative to said pin hole, a plurality of bearing holders respectively mounted on said stem around said locating groove within said hollow holder frame and a plurality of thrust bearings respectively mounted on said stem and accommodated in the respective said bearing holders; and a resilient metal retaining ring fastened to said locating groove of said stem and, said resilient metal retaining ring having an outer diameter larger than the outer diameter of said stem and positioned in said bearing holder, wherein said hollow holder frame of said actuator comprises a base frame having said accommodation chamber defined therein, a cover plate affixed to said base frame and covered over said accommodation chamber, and an outer cup fixedly capped on said cover plate and defining therein a receiving chamber; said pin of said transmission mechanism is disposed in said receiving chamber of said outer cup; said transmission mechanism further comprises two fitting sets mounted on said stem and respectively abutted against the respective said bearing holders at two opposite sides.

2. The safety linear actuator assembly as claimed in claim 1, wherein said hollow holder frame further comprises a fixation plate affixed to said cover plate to fixedly secure said outer cup to said cover plate.

3. The safety linear actuator assembly as claimed in claim 1, wherein said gear set of said actuator comprises a driven gear coaxially coupled with said stem of said lead screw; said driver comprises a motor and a driving shaft inserted through said hollow holder frame and meshed with said gear set and rotatable by said motor.

4. The safety linear actuator assembly as claimed in claim 1, wherein said lead screw of said transmission mechanism of said actuator comprises an outer thread spirally extending around the periphery thereof; said transmission mechanism further comprises a sliding block coupled to and movable along said lead screw, said sliding block comprising a screw hole threaded onto said outer thread of said lead screw.

5. The safety linear actuator assembly as claimed in claim 1, wherein said transmission mechanism of said actuator further comprises a cushion ring mounted on said stem and secured to said stem by said pin and stopped between said thrust bearings that are respectively positioned in the recessed chambers of said bearing holders; said retaining ring is respectively fastened to said locating groove of said stem and positioned in said recessed chamber of said bearing holder to prohibit said lead screw from axial displacement relative to said bearing holders and said hollow holder frame.

* * * * *